United States Patent
Yu

(10) Patent No.: US 9,527,956 B2
(45) Date of Patent: *Dec. 27, 2016

(54) MODIFIED PHOSPHORUS-CONTAINING UNSATURATED POLYESTER

(71) Applicant: ETERNAL MATERIALS CO., LTD., Kaohsiung (TW)

(72) Inventor: Pin-Chih Yu, Kaohsiung (TW)

(73) Assignee: ETERNAL MATERIALS CO., LTD., Kaohsiung (TW)

(*) Notice: Subject to any disclaimer, the term of this patent is extended or adjusted under 35 U.S.C. 154(b) by 0 days.

This patent is subject to a terminal disclaimer.

(21) Appl. No.: 14/554,978

(22) Filed: Nov. 26, 2014

(65) Prior Publication Data

US 2015/0291732 A1    Oct. 15, 2015

(30) Foreign Application Priority Data

Apr. 9, 2014   (TW) .............. 103113302 A

(51) Int. Cl.
| | |
|---|---|
| *C08G 63/02* | (2006.01) |
| *C08G 63/91* | (2006.01) |
| *C08G 63/692* | (2006.01) |
| *C08G 63/00* | (2006.01) |

(52) U.S. Cl.
CPC ......... *C08G 63/918* (2013.01); *C08G 63/6928* (2013.01)

(58) Field of Classification Search
CPC ..................................... C08G 63/44
USPC ....................... 528/287, 327, 365
See application file for complete search history.

(56) References Cited

U.S. PATENT DOCUMENTS

| | | | |
|---|---|---|---|
| 2009/0198011 A1 | 8/2009 | Dangayach et al. | |
| 2010/0069599 A1* | 3/2010 | Yatsuka | C08G 18/3218 528/73 |
| 2015/0291740 A1* | 10/2015 | Yu | C08G 79/04 523/400 |

FOREIGN PATENT DOCUMENTS

CN       101525420 B       1/2012

* cited by examiner

*Primary Examiner* — Terressa Boykin
(74) *Attorney, Agent, or Firm* — Christensen Fonder, P.A.

(57) ABSTRACT

A modified phosphorus-containing unsaturated polyester being represented by Formula I is provided:

[Formula I]

$$G1-O-\left(A'-O\right)\cdots A'-O-G2$$

wherein each A' is independently a residue of a diol or polyol, each B' is independently a residue of a saturated or unsaturated anhydride or acid, G1 and G2 are independently H or a residue of an isocyanate acrylate-based compound or isocyanate silicon-containing compound, with the proviso that G1 and G2 are not both H; and wherein a is an integer from 1 to 30, b is an integer from 1 to 30, and the modified phosphorus-containing unsaturated polyester has an OH value ranging from 50 to 200.

9 Claims, No Drawings

MODIFIED PHOSPHORUS-CONTAINING UNSATURATED POLYESTER

CLAIM FOR PRIORITY

This application claims the benefit of Taiwan Patent Application No. 103113302 filed on Apr. 10, 2014, the subject matters of which are incorporated herein by reference.

CROSS-REFERENCES TO RELATED APPLICATIONS

Not applicable.

BACKGROUND OF THE INVENTION

Field of the Invention

The present invention relates to a halogen-free reactive flame-retardant polyester, especially to a modified phosphorus-containing unsaturated polyester.

Descriptions of the Related Art

Flame retardants can be divided into three types: halogen-based flame retardants, silicon-based flame retardants and phosphorus-based flame retardants. Halogen-based flame retardants have been the most important type since the 20$^{th}$ century because of the good flame retardance, low utility level, low influence on material properties, and low price. However, the prospective of halogen-based flame retardants, especially in electronic/electrical industries, is not optimistic, because halogen pollutes the environment with a great amount of smoke and corrosive gases that are generated during thermolysis or combustion of the polymer materials using halogen-based flame retardants. Recently, phosphorus-based flame retardants have gradually taken the place of halogen-based flame retardants because they have less smoke, are non-toxic and have little or no halogen.

9,10-dihydro-9-oxa-10-phosphaphenanthrene-10-oxide (DOPO)

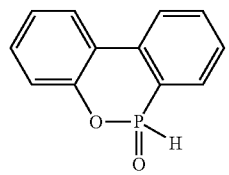 [SMILES: O=[PH]1Oc2ccccc2-c2ccccc21]

and its derivatives are newly developed phosphorus-based flame retardants over recent years. Due to the particular structures of DOPO molecules, DOPO not only has more excellent thermal stability and chemical stability than general ring-unformed organic phosphate, but includes the following advantageous characteristics: high carbon content, halogen-free, low smoke, non-toxic, no migration, lasting flame retardance, etc. For example, both U.S. Laid-open Publication No. 2009/0198011 and Chinese Patent No. 101525420 B disclose a flame retardant containing DOPO.

However, the above described polyester containing DOPO has poor compatibility with non-polar solvents or radiation-curable materials (e.g., vinyl-based material)/monomers (e.g., styrene). When applied on coating material, a compatibility problem will be encountered, and this will lead to an uneven distribution of the cured coating layer, precipitates of flame-retardant material etc, and thus limit its application.

In view of the above, the present invention provides a modified phosphorus-containing unsaturated polyester, which is radiation-curable and has good compatibility with and can be cross-linked with other radiation-curable materials (e.g., vinyl-based material). The polyester can also be easily synthesized and mass-produced. Furthermore, the use of the modified phosphorus-containing unsaturated polyester has become so widespread because it has good compatibility with non-polar solvents or monomers (e.g., styrene). The contractibility of the film prepared from the modified phosphorus-containing unsaturated polyester is low.

SUMMARY OF THE INVENTION

An objective of the present invention is to provide a modified phosphorus-containing unsaturated polyester that is represented by formula I:

[formula I]

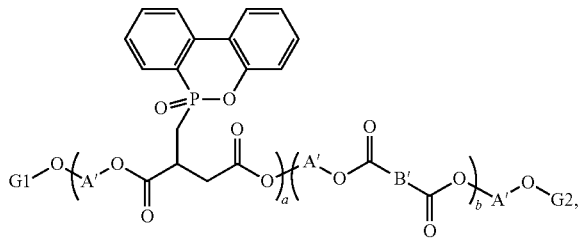

wherein each A' is independently a residue of a diol or polyol;
each B' is independently a residue of a saturated or unsaturated anhydride or acid;
G1 and G2 are independently H or a residue of an isocyanate acrylate-based compound or isocyanate silicon-containing compound, with the proviso that G1 and G2 are not both H;
a is an integer from 1 to 30; and
b is an integer from 1 to 30, and
wherein the modified phosphorus-containing unsaturated polyester has an OH value ranging from 50 to 200.

Another objective of the present invention is to provide a coating material composition, comprising: the above modified phosphorus-containing unsaturated polyester, a vinyl-based monomer, and a polymerization initiator.

Yet another objective of the present invention is to provide a method of preparing the modified phosphorus-containing unsaturated polyester, comprising the following steps:

(a) performing a polymerization reaction by reacting at least one diol or polyol, at least one saturated or unsaturated anhydride or acid, and

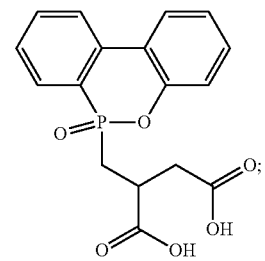 [SMILES: O=C(O)CC(CP1(=O)Oc2ccccc2-c2ccccc21)C(=O)O]

(b) reacting an isocyanate acrylate-based compound or isocyanate silicon-containing compound with the product of step (a); and
(c) optionally reacting an isocyanate silicon-containing compound with the product of step (b).

To render the above objectives, technical features and advantages of the present invention more apparent, the present invention will be described in detail with reference to some embodiments hereinafter.

BRIEF DESCRIPTION OF THE DRAWINGS

Not applicable.

DESCRIPTION OF THE PREFERRED EMBODIMENT

Hereinafter, some embodiments of the present invention will be described in detail with reference to the appended drawings. However, without departing from the spirit of the present invention, the present invention may be embodied in various embodiments and should not be limited to the embodiments described in the specification and drawings. Furthermore, for clarity, the size of each element and each area may be exaggerated in the appended drawings and not depicted in actual proportion. Unless it is additionally explained, the expressions "a," "the," or the like recited in the specification of the present invention (especially in the claims) should include both the singular and plural forms.

The modified phosphorus-containing unsaturated polyester of the present invention is obtained by polymerizing a diol or polyol, an unsaturated anhydride and/or unsaturated acid, a saturated anhydride and/or saturated acid, and

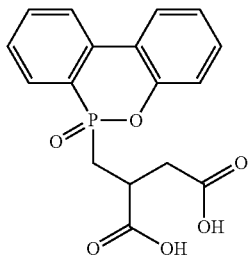 [SMILES: O=C(O)CC(CP1(=O)Oc2ccccc2-c2ccccc21)C(=O)O]

(10-(2,5-dicarboxylpropyl)-9,10-dihydro-9-oxa-10-phosphaphenanthrene-10-oxide, hereinafter "monomer (D)") and modifying the obtained polymer using an acrylate-based polymer. The modified phosphorus-containing unsaturated polyester of the present invention has unsaturated bonds (—C=C—) in the main chain. The modified phosphorus-containing unsaturated polyester of the present invention is radiation-curable (i.e., it can be cross-linked and polymerized into a solid product using UV light, visible light or high-energy rays) and therefore can be cross-linked with other radiation-curable materials. The application scope of the obtained modified phosphorus-containing unsaturated polyester is broad because it has a good compatibility with common diluting monomer (e.g., styrene) and non-polar solvents. Further, the modified phosphorus-containing unsaturated polyester of the present may further comprises "silicon" to enhance its flame retardance through the synergistic effect of phosphorus and silicon and to improve its adhesion property with a substrate (e.g., a glass substrate).

In formula I, a is an integer from 1 to 30, preferably an integer from 1 to 8, and b is an integer from 1 to 30, preferably an integer from 1 to 8. If the values of a and b are too high, that is, the molecular weight of the compound is too high, some problems in operation (e.g., viscosity to high) may be encountered in subsequent applications (e.g., in coating application). Therefore, the values of a and b should be selected depending on the practical use of the modified phosphorus-containing unsaturated polyester.

Diol or polyol according to the present invention may be any diol monomer or polyol monomer, without any particular limitations. For example, diol here (hereinafter "monomer (A)") may be selected from the group consisting of ethylene glycol, diethylene glycol, propylene glycol, dipropylene glycol, neopentyl glycol, polyethylene glycol, polypropylene glycol, styrene glycol, hexylene glycol, butylene glycol, 1-phenyl-1,2-ethylene glycol, 2-bromo-2-nitro-1,3-propylene glycol, 2-methyl-2-nitro-1,3-propylene glycol, bishydroxymethyl propanedioic acid diethyl ester, p-benzenediol, and 3,6-dithia-1,8-octanediol. Polyol here may be glycerol or pentaerythritol. According to the present invention, the preference is given to diol. In some embodiments of the present invention, monomer (A) is ethylene glycol, diethylene glycol, propylene glycol or any mixture thereof. In formula I, A' is a residue of monomer (A). For example, in the case where monomer (A) is ethylene glycol (HO—$CH_2CH_2$—OH), residue A' is —$CH_2CH_2$—.

According to the present invention, the saturated anhydride or acid may be any saturated anhydride or acid monomer with a divalent group without any particular limitations. For example, saturated anhydride or acid here (hereinafter "monomer (B1)") may be selected from the group consisting of phenyl butanedioic acid, benzyl propanedioic acid, 3-phenyl pentanedioic acid, 1,4-phenyl diacetic acid, 1,2-phenyl diacetic acid, oxalic acid, propanedioic acid, butanedioic acid, 1,2,4,5-benzene tetracarboxylic anhydride, 3,3',4,4'-diphenylmethanone-tetracarboxylic dianhydride, naphthalenedicarboxylic anhydride, 1,4,5,8-naphthalenetetracarboxylic dianhydride, cyclobutane-1,2,3,4-tetracarboxylic dianhydride, 2,3-anthracenedicarboxylic anhydride, 3,4,9,10-perylenetetracarboxylic dianhydride, 1,2,3,4-butanetetracarboxylic dianhydride, 1,2,3,4-cyclopentenetetracarboxylic dianhydride, glutaric anhydride, adipic anhydride, 3,3-dimethylglutaric anhydride, phenylsuccinic anhydride, hexahydrophthalic anhydride,

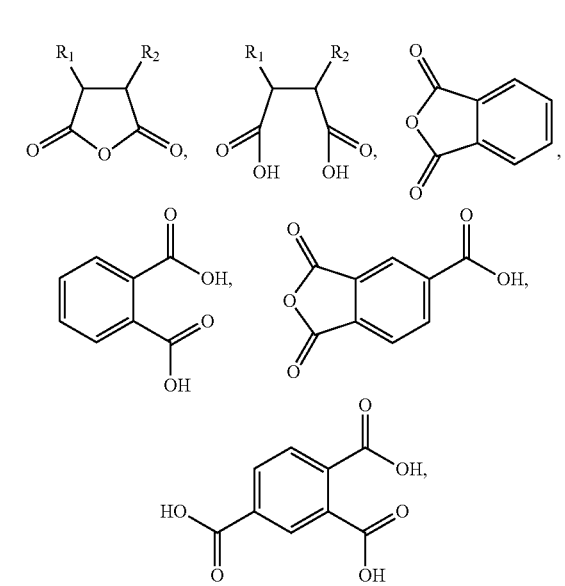

-continued

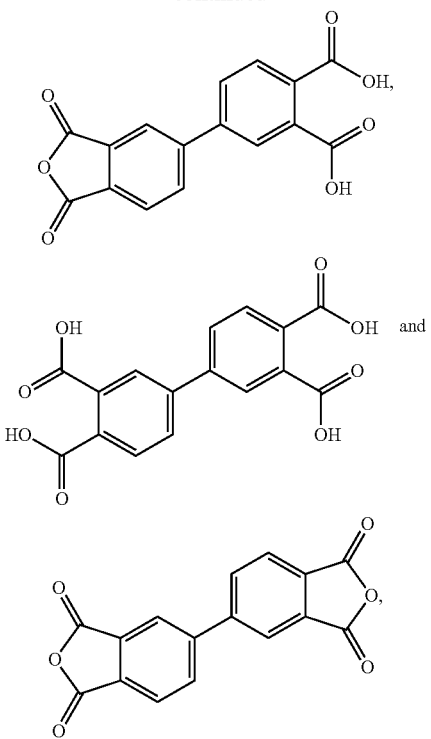

wherein $R_1$ and $R_2$ are independently H or substituted or unsubstituted C1-C15 hydroxyl. In some embodiments of the present invention, monomer (B1) is

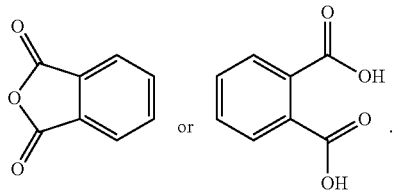 [SMILES: O=C1OC(=O)c2ccccc21 ; O=C(O)c1ccccc1C(=O)O]

According to the present invention, the unsaturated anhydride or acid (hereinafter "monomer (B2)") may be

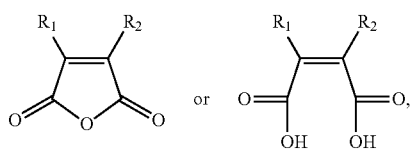

wherein $R_1$ and $R_2$ are independently H or substituted or unsubstituted C1-C15 hydroxyl. In some embodiments of the present invention, monomer (B2) is maleic acid (i.e.,

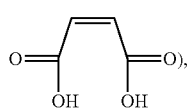

fumaric acid (i.e.,

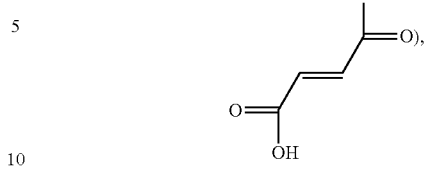

maleic anhydride (i.e.,

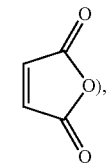

or any combination of the above.

In formula I, B' is a residue of monomer (B1) or monomer (B2). For example, in the case where monomer (B1) is

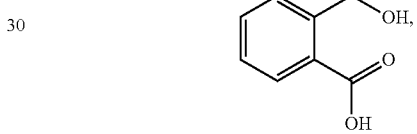

residue B' is

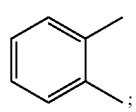

and in the case where monomer (B2) is

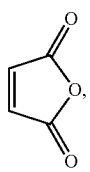

residue B' is —CH═CH—. Each B' may be identical to or different from each other. In general, when being used as a coating material, a phosphorus-containing unsaturated polyester derived from monomer (B1) could provide a better mechanical strength and thermal resistivity but tends to yellow. A phosphorus-containing unsaturated polyester derived from monomer (B2) could be cured quickly, but the cured coating is hard and brittle and thus fragile. Furthermore, according to the present invention, the side chain of residue B' preferably has no active group (e.g., $H_2C$═CH— group), because the active group may affect the result of modification of the unsaturated polyester. For example, the active group may lead to the generation of undesired by-products.

According to the present invention, G1 and G2 in formula I may be identical to or different from each other and may be independently H or a residue of an isocyanate acrylate-based compound (hereinafter "monomer (P)") or isocyanate silicon-containing compound (hereinafter "monomer (Q)"), with the proviso that G1 and G2 are not both H. For example, in the case where monomer (P) is

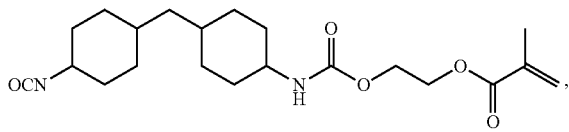

residue G1 or G2 obtained from monomer (P) is

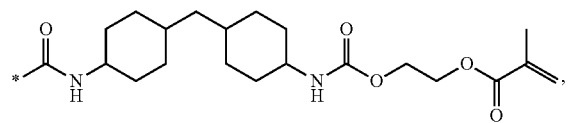 [SMILES: *C(=O)NC1CCC(CC2CCC(NC(=O)OCCOC(=O)C(=C)C)CC2)CC1]

and in the case where monomer (Q) is

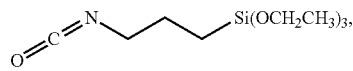

residue G1 or G2 obtained from monomer (Q) is

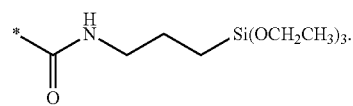

Monomer (P) may be a compound with a G"-G'-*NCO structure, wherein G' may be selected from the group consisting of

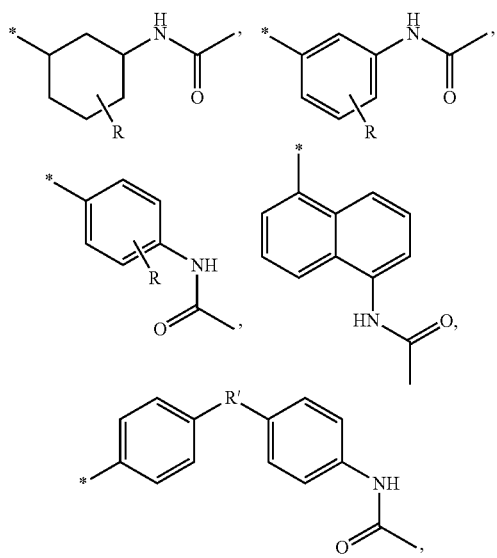

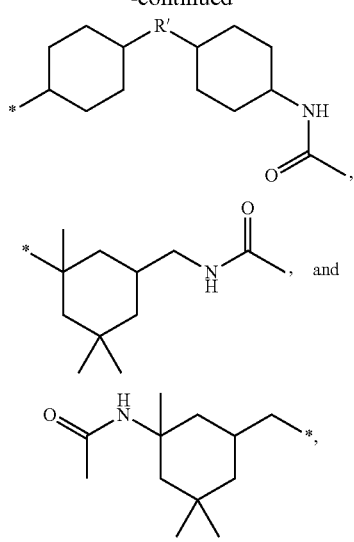

wherein R is H or methyl, R' is

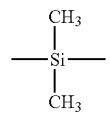

or C1-C15 linear or branched alkylene. In some embodiments of the present invention, G' is selected from the group consisting of

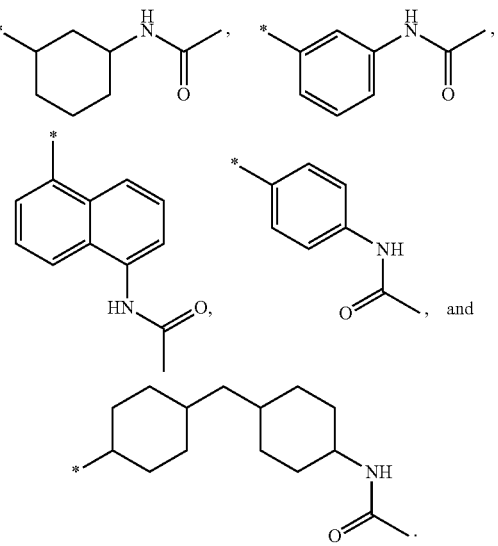

Group G" is a residue of hydroxyl-containing acrylate-based compound. In some embodiments of the present invention, the above described hydroxyl-containing acrylate-based compound may be pentaerythritol triacrylate, hydroxyethyl acrylate (HEA), 2-hydroxyethyl methacrylate (HEMA), hydroxypropyl acrylate, or 2-hydroxypropyl acrylate. For example, residue G" obtained from HEA is

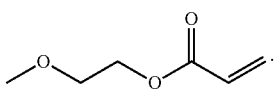

According to the present invention, the synthesizing method of monomer (P) is not particularly limited, it could be, for example, obtained by reacting a monomer containing multiple isocyanate functional groups (hereinafter "monomer (P1)") and a hydroxyl-containing acrylate monomer (hereinafter "monomer (P2)"). Monomer (P1) is preferably a diisocyanate-based compound, which may be selected from the group consisting of

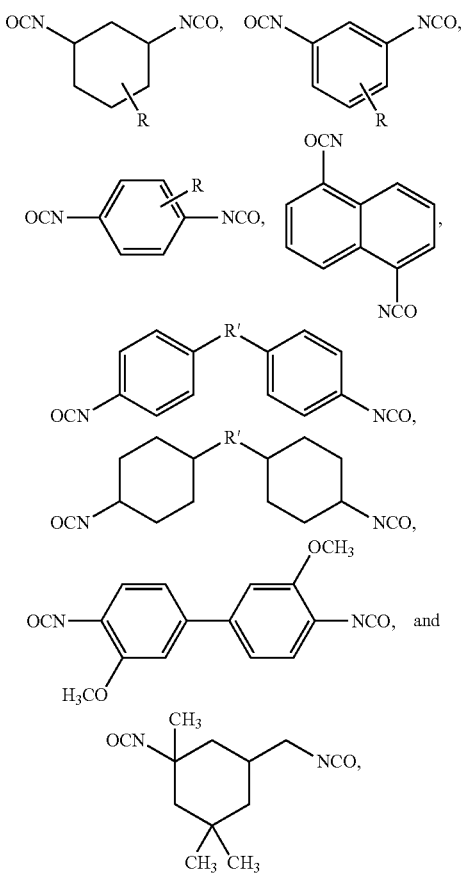

wherein R is H or methyl, R' is

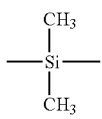

or C1-C15 linear or branched alkylene. Monomer (P1) is preferably

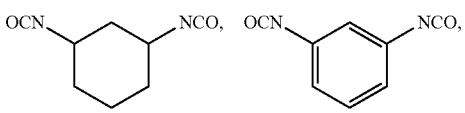

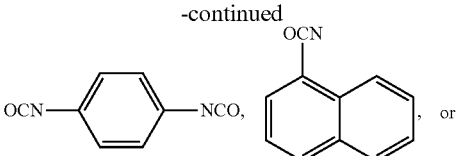

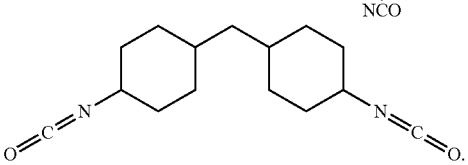

Monomer (P2) is preferably selected from the group consisting of tris(2-hydroxy ethyl) isocyanurate triacrylate, pentaerythritol triacrylate, hydroxyethyl acrylate (HEA), 2-hydroxyethyl methacrylate (HEMA), hydroxypropyl acrylate, 2-hydroxypropyl acrylate, and any combinations thereof.

According to the present invention, monomer (Q) may be a compound with a G'''-*NCO structure, wherein G''' is

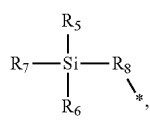

$R_5$ and $R_6$ are independently C1-C15 linear or branched alkyl, C1-C15 linear or branched alkoxy, or

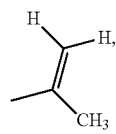

$R_7$ is C1-C15 linear or branched alkyl or alkoxy, $R_8$ is C1-C15 linear or branched alkylene, polyether group or arylene. Monomer (Q) is preferably

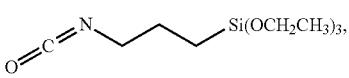

and in this case, G''' is

Presently, commercially available DOPO-containing flame retardants' compatibility with non-polar solvents or radiation-curable materials (e.g., vinyl-based material)/monomers (e.g., styrene) are poor because they do not have active groups, and this will become problematic when coating materials due to the uneven distribution of the cured coating layer and precipitates of flame-retardant material. In view of this, the present invention performs a modification to the polyester represented by the following formula II using an isocyanate acrylate-based compound (i.e., monomer (P)),

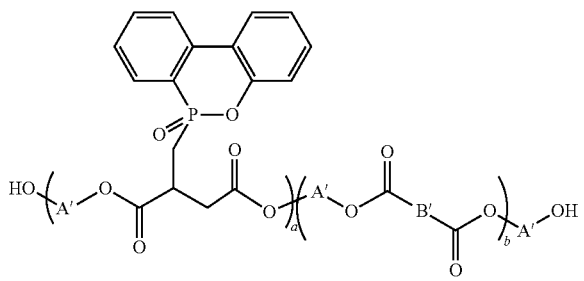
[formula II]

wherein residue A' and residue B' and polymerization unit numbers a and b are defined as recited herein. The present invention is characterized in that monomer (P) has active groups, such as isocyanato groups, which may generate chemical bonding with hydroxyl at the end of the polyester that is represented by formula II to make the polyester become a reactive polyester. The reactive polyester may take part in a polymerization reaction and thereby be embedded into polymer's molecular structure, which prevents migration. Furthermore, when the reactive polyester is used as a coating material, due to its outstanding compatibility, flame retardants could be evenly distributed in polyester after curing without precipitation.

According to the present invention, the flame-retardant polyester represented by formula II is modified by monomer (P) to impart reactive functional groups, such as vinyl, to the polyester. During the modification, the remaining hydroxyl may be optionally reacted with an isocyanate silicon-containing compound (i.e., monomer (Q)) to produce an unsaturated polyester with both silicon and phosphorus. By the synergistic effect of silicon and phosphorus, the flame retardance of the produced polyester could be further improved. When the flame-retardant polyester modified by monomer (Q) is used as a coating material, it could provide a superior adhesion property with substrate due to its silyloxy functional groups. In some embodiments of the present invention, at least one of G1 and G2 is

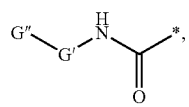

and the other one of them is selected from the group consisting of H,

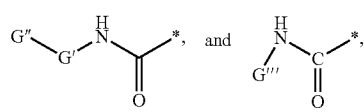

wherein G', G'', G''' are defined as recited herein.

In the case of producing the above unsaturated polyester comprising the residue of the isocyanate silicon-containing compound, the molar ratio of the isocyanate silicon-containing compound (i.e., monomer (Q)) to isocyanate acrylate-based compound (i.e., monomer (P)) preferably ranges from 1:99 to 1:1. In some embodiments of the present invention, the above molar ratio ranges from 1:99 to 1:90, 1:80 to 1:65, 20:1 to 3:1, 10:1 to 6:1, or 1:45 to 1:15, but the present invention is not limited thereto. The molar ratio depends on the amount of alkoxy of the isocyanate silicon-containing compound. The contribution of the designated molar ratio lies in the following characteristics: (1) improvement in flame retardance; (2) improvement in the adhesion property with specific substrates (e.g., a composite material, glass fiber or glass substrate); and (3) improvement in the flexibility of the film prepared thereby due to a proper crosslinking density.

The present invention further provides a method of preparing the modified phosphorus-containing unsaturated polyester represented by formula I, comprising the following steps:
(a) performing a polymerization reaction by reacting at least one diol or polyol (monomer (A)), at least saturated anhydride or acid (monomer (B1)) and/or unsaturated anhydride or acid (monomer (B2)), and

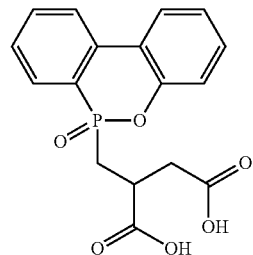 [SMILES: O=C(O)CC(CP1(=O)Oc2ccccc2-c2ccccc21)C(=O)O]

(monomer (D));
(b) reacting an isocyanate acrylate-based compound (monomer (P)) or isocyanate silicon-containing compound (monomer (Q)) with the product of step (a); and
(c) optionally reacting an isocyanate silicon-containing compound (monomer (Q)) with the product of step (b).

In step (a), the amount of monomer (A) is more than monomer (B1) and/or monomer (B2) to obtain a hydroxyl-terminated (—OH) product. The product obtained from step (a) may have a structure represented by the following formula II,

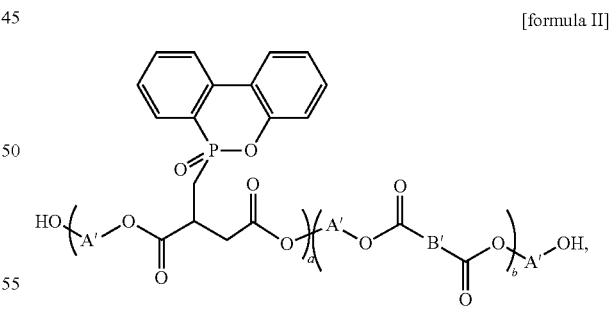
[formula II]

wherein residue A' and residue B' and polymerization unit numbers a and b are defined as recited herein. Monomer (B2) is preferably used in step (a) to take part in the reaction, and in step (b), the modification is performed by reacting isocyanate acrylate-based compound(s) with the product of step (a).

In step (b), the obtained polymer of formula II is reacted with monomer (P) with a G''-G'-*NCO structure to obtain a modified phosphorus-containing unsaturated polyester represented by following formula III,

[formula III]

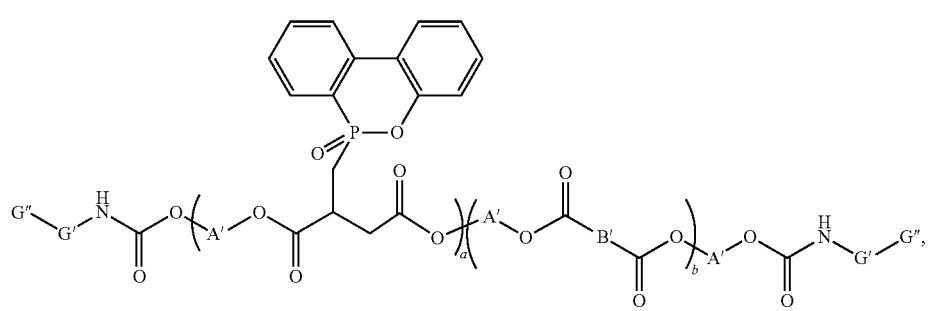

wherein residue A', B', G' and G" and polymerization unit numbers a and b are defined as recited herein. In step (b), monomer (P) is obtained by the reaction of a mixture of monomer with multiple isocyanate functional groups (i.e., monomer (P1)) and hydroxyl-containing acrylate monomer (i.e., monomer (P2)). For example, in the case where monomer (P1) is

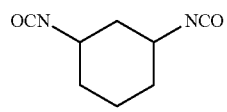

and monomer (P2) is 2-hydroxyethyl methacrylate (HEMA), a product represented by the following formula III-1 will be obtained.

The ends of the structure of the product obtained from step (b) (i.e., the modified phosphorus-containing unsaturated polyester represented by formula III) are usually G"-G'-, i.e., the residue of isocyanate acrylate-based compound. According to the present invention, the mixing sequence of monomer (P1) and monomer (P2) with the polymer of formula II is not particularly limited. For example, monomer (P1) and monomer (P2) may be mixed with the polymer of formula II with the following methods: (1) by mixing monomer (P1) with monomer (P2) first and then mixing the obtained mixture with the polymer of formula II, (2) by mixing monomer (P1) with the polymer of formula II first and then mixing the obtained mixture with monomer (P2), or (3) by mixing monomer (P2) with the polymer of formula II first and then mixing the obtained mixture with monomer (P1). Furthermore, the temperature of polymerization reaction depends on the species of applied raw material. The timing of terminating the polymerization reaction depends on whether the desired viscosity and OH value of the product are reached. The viscosity of the obtained phosphorus-containing unsaturated polyester preferably ranges between G-Z (measured by GARDNER viscometer), e.g., G-H, I-J, K-L, M-N, O-P, Q-R, R-S, T-U, V-W, W-X, or X-Y. The acid value of the obtained phosphorus-containing unsaturated polyester preferably ranges from 20 to 40. The OH value of the obtained phosphorus-containing unsaturated polyester preferably ranges from 50 to 200. The detailed preparation process of the phosphorus-containing unsaturated polyester will be provided in the appended Examples.

After step (b), monomer (Q) may be optionally added to react with remained hydroxyl (i.e., step (c)) to obtain a product represented by the following formula IV,

[formula III-1]

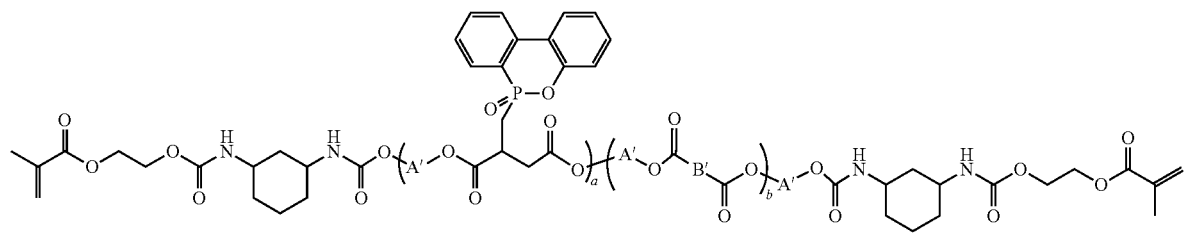

[formula IV]

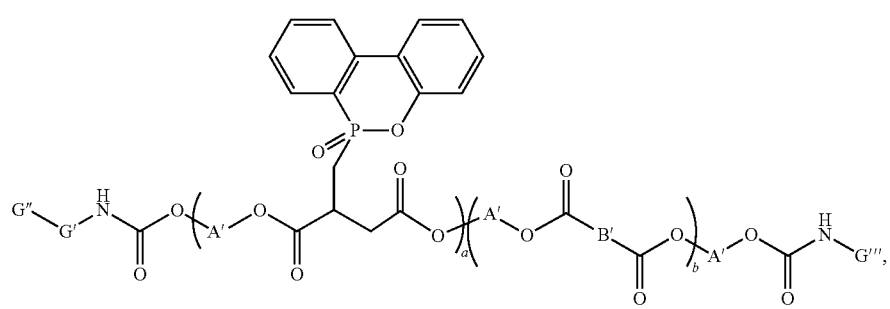

wherein residue A', B', G', G" and G'" and polymerization unit numbers a and b are defined as recited herein.

For example, in the case where monomer (Q) is

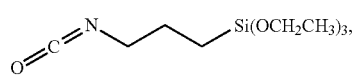

monomer (P1) is

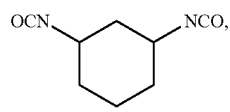

and monomer (P2) is 2-hydroxylethyl methacrylate, a product represented by the following formula IV-1 will be obtained after step (c),

[formula IV-1]

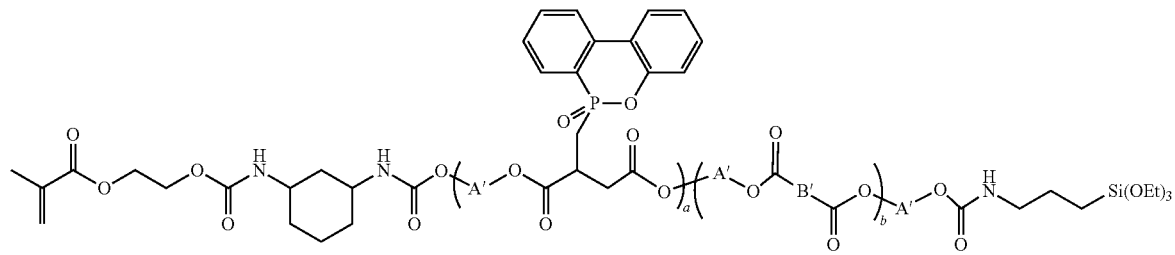

Since the product may still have hydroxyl in structure after the optional step (c), residue G1 and residue G2 in the obtained product of formula I may be identical to or different from each other, and could be H, a residue of an isocyanate acrylate-based compound or a residue of an isocyanate silicon-containing compound independently. Furthermore, since the phosphorus-containing unsaturated polyester according to the present invention should be a modified one, G1 and G2 in formula I are not both H.

According to the method of preparing flame-retardant polyester of the present invention, monomer (D) is used as a reactant. Compared to the process using DOPO as a reactant, the flame-retardant polyester prepared by the method of the present invention has a higher phosphorus content and thus better flame retardance. According to the present invention, the mixing sequence may be adjusted depending on needs. For example, if a product with a superior vinyl-based unsaturated group reactivity is desired, the mixture of monomer (P1) and monomer (P2) is preferably mixed with the polymer first; and if a product with superior bonding strength is desired, monomer (Q) is preferably added into the polymer first. Furthermore, the temperature of the polymerization reaction may be determined depending on raw materials for reaction. The timing of terminating polymerization reaction depends on whether the desired viscosity and OH value of the obtained product are reached. The viscosity of the obtained phosphorus-containing unsaturated polyester is preferably in the range of G-Z (measured by GARDNER viscometer), e.g., G-H, I-J, K-L, M-N, O-P, Q-R, R-S, T-U, V-W, or X-Y. The acid value of the obtained phosphorus-containing unsaturated polyester preferably ranges from 20 to 40. The OH value of the obtained phosphorus-containing unsaturated polyester preferably ranges from 50 to 200. The detailed preparation process of the phosphorus-containing unsaturated polyester will be provided in the appended Examples.

In the preparation of the modified phosphorus-containing unsaturated polyester represented by formula I, the amount of each monomers preferably meets the following conditions in consideration of the stability and applicability of the obtained product. The ratio of the total molar amount of monomers (A), (B1), (B2) and (D) to the total molar amount of monomers (P) and (Q) is 10:1 to 1:2, preferably 6:1 to 1:1.2, more preferably 4:1 to 1:1. The ratio of the molar amount of monomer (A) to the total molar amount of monomers (B1), (B2) and (D) is 15:1 to 1:1, preferably 10:1 to 3:1, and more preferably 6:1 to 4:1. In the case where the residue of isocyanate silicon-containing compound exists, the ratio of the molar amount of monomer (P) to the molar amount of monomer (Q) is 99:1 to 1:1.

In the modified phosphorus-containing unsaturated polyester or polyester composition of the present invention, the OH value of the modified phosphorus-containing unsaturated polyester is not higher than 200. If the OH value is higher than 200, gelation may occur in the polyester. Therefore, to ensure a good stability, storage stability and coating operability, the OH value of the modified phosphorus-containing unsaturated polyester preferably ranges from 50 to 200. Furthermore, the phosphorus amount of the modified phosphorus-containing unsaturated polyester may be adjusted by persons with ordinary skill in the art based on their needs for flame retardance, and is not particularly limited. For example, if UL-94 V0 level flame retardance is required, the phosphorus-containing amount is generally at least 1.5%, preferably at least 2.0%, and more preferably at least 2.3%, based on the total weight of the unsaturated polyester. According to some preferred embodiments of the present invention, the phosphorus amount of the modified phosphorus-containing unsaturated polyester is 2.3% to 8% based on the total weight of the polyester, e.g., 2.5%, 3.0%, 3.6%, 4%, and 5%, but not limited thereto.

The modified phosphorus-containing unsaturated polyester of the present invention has the following advantages: radiation-curable, good compatibility with non-polar solvents or monomer (e.g., styrene), and good adhesion property with substrates. Thus, it can be widely used in various applications. For example, it may be used in flame retardants, coating materials, pigment (e.g., inorganic powder), dispersant, and binding promoter. Therefore, the present invention also provides a coating material composition, which comprises the modified phosphorus-containing unsaturated polyester represented by formula I as described above, a vinyl-based monomer, and a polymerization initiator. The polymerization initiator (e.g., a photoinitiator) is used for initiating the crosslinking polymerization (e.g., UV light polymerization) between the vinyl monomer and the unsaturated polyester to form a solid product. Based on the total weight of the coating material composition, the amount of vinyl monomer ranges from 0% to 60%, preferably 0% to 55%, more preferably 10% to 40%, but is not limited thereto. The amount of polymerization initiator is not particularly limited, as long as it is sufficient to initiate the polymerization reaction. Based on the total weight of the composition of the coating material, the amount of the modified phosphorus-containing unsaturated polyester ranges from 40% to 100%, preferably 45% to 99.9%, and more preferably 60% to 90%, but is not limited thereto.

In the coating material composition of the present invention, the vinyl monomer may be but is not limited to a (methyl)acrylic monomer, a mono-functional or multi-functional (methyl)acrylate monomer, or any mixture thereof. The monomer may preferably be a (methyl)acrylate monomer. A mono-functional (methyl)acrylate monomer may be selected from the group consisting of methyl methacrylate (MMA), butyl methacrylate, 2-phenoxy ethyl acrylate, ethoxylated 2-phenoxy ethyl acrylate, 2-(2-ethoxyethoxyl) ethyl acrylate, cyclic trimethylolpropane formal acrylate, carboxyethyl acrylate, 3,3,5-trimethyl cyclohexane acrylate, ortho-phenyl phenoxy ethyl acrylate, cumyl phenoxyl ethyl acrylate, lauryl methacrylate, isooctyl acrylate, stearyl methacrylate, isodecyl acrylate, isobornyl methacrylate, benzyl acrylate, 2-hydroxyethyl methacrylate phosphate, caprolactone acrylate, hydroxyethyl acrylate (HEA), 2-hydroxyethyl methacrylate (HEMA), and mixtures thereof, but is not limited thereto. A multi-functional (methyl)acrylate monomer may be selected from the group consisting of hydroxypivalyl hydroxypivalate diacrylate, 1,6-hexanediol diacrylate, ethoxylated 1,6-hexanediol diacrylate, dipropylene glycol diacrylate, tricyclodecane dimethanol diacrylate, ethoxylated dipropylene glycol diacrylate, neopentyl glycol diacrylate, propoxylated neopentyl glycol diacrylate, ethoxylated bisphenol-A dimethacrylate, 2-methyl-1,3-propanediol diacrylate, ethoxylated 2-methyl-1,3-propanediol diacrylate, 2-butyl-2-ethyl-1,3-propanediol diacrylate, ethylene glycol dimethacrylate (EGDMA), diethylene glycol dimethacrylate, tris(2-hydroxy ethyl) isocyanurate triacrylate, pentaerythritol triacrylate, ethoxylated trimethylolpropane triacrylate, propoxylated trimethylolpropane triacrylate, trimethylolpropane trimethacrylate, pentaerythritol tetraacrylate, ethoxylated pentaerythritol tetraacrylate, ditrimethylolpropane tetraacrylate, propoxylated pentaerythritol tetraacrylate, dipentaerythritol hexaacrylate, tripropylene glycol dimethacrylate, 1,4-butanediol dimethacrylate, 1,6-hexanediol dimethacrylate, allylated cyclohexyl dimethacrylate, isocyanurate dimethacrylate, ethoxylated trimethylolpropane trimethacrylate, propoxylated glycerol trimethacrylate, tris(acryloxyethyl) isocyanurate, trimethylolpropane triacrylate, and mixtures thereof, but is not limited thereto. The vinyl monomer is preferred to be 2-phenoxy ethyl acrylate, lauryl methacrylate, isodecyl acrylate, isoborny methacrylate, trimethylolpropane trimethacrylate, pentaerythritol tetraacrylate, ethoxylated trimethylol propane trimeth acrylate, propoxylated glycerol trimethacrylate, trimethylolpropane triacrylate, or any mixture thereof. Usable commercial vinyl monomers in the present invention include the following merchandises of Eternal Company: trade names are EM223, EM328, EM2308, EM231, EM219, EM90, EM70, EM235, EM2381, EM2382, EM2383, EM2384, EM2385, EM2386, EM2387, EM331, EM3380, EM241, EM2411, EM242, EM2421, and EM265.

Optionally, the coating material composition of the present invention may further comprise other conventional coating components or additives, such as silicone compound, clay, defoaming agent, leveling agent, photostabilizer, antistatic agent, ultraviolet absorber, reactive filler, non-reactive filler, reactive flexibilizer, elastomer, diluent, and the like. The usage and amount of the conventional components or additives are not particularly limited and may be optionally adjusted by persons with ordinary skill in the art based on their ordinary skill and the disclosure of the present specification.

The present invention is further illustrated by following embodiments, which are only for the illustration. The scope of the present invention should not be limited thereto.

EXAMPLES

Example 1

Preparation of Modified Phosphorus-containing Unsaturated Polyester Represented by Formula III First, 115 g of ethylene glycol, 182 g of diethylene glycol and 295 g of 10-(2,5-dicarboxylpropyl)-9,10-dihydro-9-oxa-10-phosphaphenanthrene-10-oxide are added into a 1-liter round-bottom reaction flask. The obtained mixture is reacted at 200° C. for 6 hours until the acid value thereof reaches a value among 5 to 10. Afterwards, 175 g of maleic anhydride is added into the reaction flask, and the obtained mixture is reacted at 200° C. for 6 hours until the acid value thereof reaches a value from 25 to 30 and the viscosity thereof is X-Y in 35% styrene (measured by GARDNER viscometer). The reaction flask is then cooled down to 60° C. On the other hand, 77 g of 2-hydroxyethyl methacrylate is mixed with 155 g of 4,4'-dicyclohexylmethane diisocyanate in a flask. The obtained mixture is heated to 60° C. while being stirred and kept at 60° C. for 2 hours. Then, the stirred mixture is added into the reaction flask which has been cooled down to 60° C. for the reaction until the OH value thereof reaches a value from 130 to 170 and the viscosity thereof is W-X in 35% styrene (measured by GARDNER viscometer). A modified phosphorus-containing unsaturated polyester represented by formula III is obtained thereby. The measured phosphorus amount of the unsaturated polyester is 2.65%.

Example 2

Preparation of Unsaturated Polyester Composition Containing Unsaturated Polyester of Formula III and Unsaturated Polyester of Formula IV First, 115 g of ethylene glycol, 182 g of diethylene glycol and 295 g of 10-(2,5-dicarboxylpropyl)-9,10-dihydro-9-oxa-10-phosphaphenanthrene-10-oxide are added into a 1-liter round-bottom reaction flask, the obtained mixture is reacted at 200° C. for 6 hours until the acid value thereof reaches a value from 5 to 10. Afterwards, 175 g of maleic anhydride is added into the reaction flask, and the obtained mixture is reacted at 200° C. for 6 hours until the acid value thereof reaches a value from 25 to 30 and the viscosity thereof is X-Y in 35% styrene (measured by GARDNER viscometer). The reaction flask is then cooled down to 60° C. On the other hand, 77 g of 2-hydroxyethyl methacrylate is mixed with 155 g of 4,4'-dicyclohexylmethane diisocyanate in a flask, and the obtained mixture is heated to 60° C. while being stirred and kept at 60° C. for 2 hours. Then, the stirred mixture is added into the reaction flask which has cooled down to 60° C. for the reaction until the OH value thereof reaches a value from 30 to 150. Then, the reaction flask is cooling down to 45° C., and 45 g of 1,3,5-tris (trimethoxysilylpropyl)polyisocyanate is added into the reaction flask to react for 3 hours, until the OH value thereof reaches a value from 25 to 145 and the viscosity thereof is X-Y in 35% styrene (measured by GARDNER viscometer). An unsaturated polyester composition containing unsaturated polyester of formula III and unsaturated polyester of formula IV is obtained thereby. The measured phosphorus amount of the unsaturated polyester composition is 2.53%.

Example 3

Preparation of Modified Phosphorus-containing Unsaturated Polyester Represented by Formula III First, 115 g of ethylene glycol, 182 g of diethylene glycol and 295 g of 10-(2,5-dicarboxylpropyl)-9,10-dihydro-9-oxa-10-phosphaphenanthrene-10-oxide are added into a 1-liter round-bottom reaction flask. The obtained mixture is reacted at 200° C. for 6 hours until the acid value thereof reaches a value from 5 to 10. Afterwards, 175 g of maleic anhydride is added into the reaction flask, and the obtained mixture is reacted at 200° C. for 6 hours until the acid value thereof reaches a value from 25 to 30 and the viscosity thereof is X-Y in 35% styrene (measured by GARDNER viscometer). The reaction flask is then cooled down to 60° C. On the other hand, 77 g of 2-hydroxyethyl methacrylate is mixed with 147.9 g of dibenzyl diisocyanate (molecular weight: 250.25) in a flask and the obtained mixture is heated to 60° C. while being stirred and kept at 60° C. for 2 hours. Then, the stirred mixture is added into the reaction flask which has been cooled down to 60° C. to react, until the OH value thereof reaches a value from 130 to 170 and the viscosity thereof is W-X in 35% styrene (measured by GARDNER viscometer). A modified phosphorus-containing unsaturated polyester represented by formula III is prepared thereby. The measured phosphorus amount of the unsaturated polyester is 2.66%.

Example 4

Preparation of Modified Phosphorus-containing Unsaturated Polyester Represented by Formula III First, 115 g of ethylene glycol, 182 g of diethylene glycol and 295 g of 10-(2,5-dicarboxylpropyl)-9,10-dihydro-9-oxa-10-phosphaphenanthrene-10-oxide are added into a 1-liter round-bottom reaction flask. The obtained mixture is reacted at 200° C. for 6 hours until the acid value thereof reaches a value from 5 to 10. Afterwards, 175 g of maleic anhydride is added into the reaction flask, and the obtained mixture is reacted at 200° C. for 6 hours until the acid value thereof reaches a value from 25 to 30 and the viscosity thereof is X-Y in 35% styrene (measured by GARDNER viscometer). The reaction flask is then cooled down to 60° C. On the other hand, 77 g of 2-hydroxyethyl methacrylate is mixed with 94.6 g of p-phenyl diisocyanate (molecular weight: 160.13) in a flask, and the obtained mixture is heated to 60° C. under stirring and kept at 60° C. for 2 hours. Then, the stirred mixture is added into the reaction flask which has been cooled down to 60° C. to react, until the OH value thereof reaches a value from 130 to 170 and the viscosity thereof is W-X in 35% styrene (measured by GARDNER viscometer). A modified phosphorus-containing unsaturated polyester represented by formula III is prepared thereby. The measured phosphorus amount of the unsaturated polyester is 2.82%.

Example 5

Preparation of Unsaturated Polyester Composition Containing Unsaturated Polyester of Formula III and Unsaturated Polyester of Formula IV First, 115 g of ethylene glycol, 182 g of diethylene glycol and 295 g of 10-(2,5-dicarboxylpropyl)-9,10-dihydro-9-oxa-10-phosphaphenanthrene-10-oxide are added into a 1-liter round-bottom reaction flask, the obtained mixture is reacted at 200° C. for 6 hours until the acid value thereof reaches a value from 5 to 10. Afterwards, 175 g of maleic anhydride is added into the reaction flask, and the obtained mixture is reacted at 200° C. for 6 hours until the acid value thereof reaches a value from 25 to 30 and the viscosity thereof is X-Y in 35% styrene (measured by GARDNER viscometer). The reaction flask is then cooled down to 60° C. On the other hand, 77 g of 2-hydroxypropyl acrylate (CAS No.: 999-61-1, molecular weight: 130.14) is mixed with 99.4 g of 1,6-diisocyanato hexane (molecular weight: 168.19) in a flask, and the obtained mixture is heated to 60° C. while being stirred and kept at 60° C. for 2 hours. Then, the stirred mixture is added into the reaction flask which has been cooled down to 60° C. for the reaction until the OH value thereof reaches a value from 30 to 150. Then, the reaction flask is cooled down to 45° C., and 45 g of 1,3,5-tris(trimethoxysilylpropyl)polyisocyanate is added into the reaction flask to react for 3 hours, until the OH value thereof reaches a value from 25 to 145 and the viscosity thereof is X-Y in 35% styrene (measured by GARDNER viscometer). An unsaturated polyester composition containing an unsaturated polyester of formula III and unsaturated polyester of formula IV is obtained thereby. The measured phosphorus amount of the unsaturated polyester composition is 2.67%.

Example 6

Preparation of Modified Phosphorus-containing Unsaturated Polyester Represented by Formula III First, 115 g of ethylene glycol, 182 g of diethylene glycol and 295 g of 10-(2,5-dicarboxylpropyl)-9,10-dihydro-9-oxa-10-phosphaphenanthrene-10-oxide are added into a 1-liter round-bottom reaction flask. The obtained mixture is reacted at 200° C. for 6 hours until the acid value thereof reaches a value from 5 to 10. Afterwards, 175 g of maleic anhydride is added into the reaction flask, and the obtained mixture is reacted at 200° C. for 6 hours until the acid value thereof reaches a value from 25 to 30 and the viscosity thereof is X-Y in 35% styrene (measured by GARDNER viscometer). The reaction flask is then cooled down to 60° C. On the other hand, 176.5 g of pentaerythritol triacrylate (molecular weight: 298.29) is mixed with 155 g of 4,4'-dicyclohexylmethane diisocyanate in a flask. The obtained mixture is heated to 60° C. while being stirred and kept at 60° C. for 2 hours. Then, the stirred mixture is added into the reaction flask which has been cooled down to 60° C. for the reaction until the OH value thereof reaches a value from 130 to 170 and the viscosity thereof is W-X in 35% styrene (measured by GARDNER viscometer). A modified phosphorus-containing unsaturated polyester represented by formula III is prepared thereby. The measured phosphorus amount of the unsaturated polyester is 2.41%.

Example 7

Preparation of Unsaturated Polyester Composition Containing Unsaturated Polyester of Formula III and Unsaturated Polyester of Formula IV First, 115 g of ethylene glycol, 182 g of diethylene glycol and 295 g of 10-(2,5-dicarboxylpropyl)-9,10-dihydro-9-oxa-10-phosphaphenanthrene-10-oxide are added into a 1-liter round-bottom reaction flask. The obtained mixture is reacted at 200° C. for 6 hours until the acid value thereof reaches a value from 5 to 10. Afterwards, 175 g of maleic anhydride is added into the reaction flask, and the obtained mixture is reacted at 200° C. for 6 hours until the acid value thereof reaches a value from 25 to 30 and the viscosity thereof is X-Y in 35% styrene (measured by GARDNER viscometer). The reaction flask is then cooled down to 60° C. On the other hand, 176.5 g of pentaerythritol triacrylate (molecular weight: 298.29) is mixed with 155 g of 4,4'-dicyclohexylmethane diisocyanate in a flask, and the obtained mixture is heated to 60° C. while being stirred and kept at 60° C. for 2 hours. Then, the stirred mixture is added into the reaction flask which has been cooled down to 60° C. for the reaction until the OH value thereof reaches a value from 30 to 150. Then, the reaction flask is cooled down to 45° C., and 45 g of 1,3,5-tris(trimethoxysilylpropyl)polyisocyanate is added into the reaction flask to react for 3 hours, until the OH value thereof reaches a value from 25 to 145 and the viscosity thereof is X-Y in 35% styrene (measured by GARDNER viscometer). An unsaturated polyester composition containing an unsaturated polyester of formula III and unsaturated polyester of formula IV is obtained thereby. The measured phosphorus amount of the unsaturated polyester composition is 2.31%.

[Flame Retardance Test, Film Formability Test, Adhesion Property Test, and Film Hardness Test]

The modified phosphorus-containing unsaturated polyesters prepared from Examples 1 to 7 are subjected to the retardance test, film formability test, adhesion property test, and film hardness test. The flame retardance test is performed according to UL 94 standard for resin. Film formability test is performed by the following method: (1) 65 parts by weight of the modified phosphorus-containing unsaturated polyester, 35 parts by weight of styrene, 6 parts by weight of cobalt isooctanoic acid, and 1 part by weight of methyl ethyl ketone peroxide (MEKPO) are mixed with each other, (2) the obtained mixture is coated on a PET substrate and cured to form a 500 μm thick film, (3) the flatness of the formed film is observed, and (4) if no warping is observed, the result is recorded as "good." The adhesion property test is performed by the following method: (1) 100 parts by weight of the modified phosphorus-containing unsaturated polyester, 6 parts of cobalt isooctanoic acid, and 1 part by weight of methyl ethyl ketone peroxide (MEKPO) are mixed with each other, (2) the obtained mixture is coated on two sheets of identical composite material (length× width×height: 25 cm×25 cm×3 mm), (3) the two sheets are face-to-face adhered in a 25 cm×20 cm area, and a temporary material (PET film) is placed in the rest area between the adhered faces, (4) the mixture is cured and the temporary material is removed to thereby form a splitting region, (5) the adhesion property is evaluated by splitting the sheets using the splitting region and observing the peeling degree of the cured film on the composite material and (6) is classified as excellent (the film does not peel or only slightly peeled), good (the film peeled in a certain area), or poor (the film seriously peeled or completely peeled). Film harness is evaluated by the pencil hardness test under JIS K5400 standard method (substrate: poly(ethylene terephthalate) (PET)/wood plate). The results are shown in Table 1.

TABLE 1

| Species of the polyester (with/without silicon) | UL-94 | Film formability | Adhesion property | Hardness (PET/wood plate) |
|---|---|---|---|---|
| Example 1 without silicon | V0 | good | good | 4H/4H |
| Example 2 with silicon | V0 | good | excellent | 4H/4H |
| Example 3 without silicon | V0 | good | good | 4H/4H |
| Example 4 without silicon | V0 | good | good | 4H/4H |
| Example 5 with silicon | V0 | good | excellent | 4H/4H |
| Example 6 without silicon | V0 | good | good | 4H/4H |
| Example 7 with silicon | V0 | good | excellent | 4H/4H |

As shown in Table 1, all of the modified phosphorus-containing unsaturated polyester and polyester composition of the present invention with or without silicon can pass UL-94 V0 level flame retardance test and therefore have excellent flame retardant property. When they are used as a coating material, they could provide outstanding film formability and adhesion property, and the hardness of prepared films is not lower than 4H.

The examples described above are only examples explaining the principle and effects of the present invention, and illustrating the technical features of the present invention, but not for limiting the scope of the present invention. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:
1. A modified phosphorus-containing unsaturated polyester being represented by formula I:

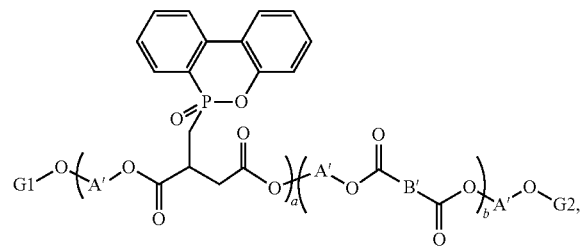

[formula I]

wherein
each A' is independently a residue of a diol or polyol;
each B' is independently a residue of a saturated or unsaturated anhydride or acid;

G1 and G2 are independently H or a residue of an isocyanate acrylate-based compound or isocyanate silicon-containing compound, with the proviso that G1 and G2 are not both H;

a is an integer from 1 to 30; and b is an integer from 1 to 30, and wherein the modified phosphorus-containing unsaturated polyester has an OH value ranging from 50 to 200, wherein the diol is selected from the group consisting of ethylene glycol, diethylene glycol, propylene glycol, dipropylene glycol, neopentyl glycol, polyethylene glycol, polypropylene glycol, styrene glycol, hexylene glycol, butylene glycol, 1-phenyl-1,2-ethylene glycol, 2-bromo-2-nitro-1,3-propylene glycol, 2-methyl-2-nitro-1,3-propylene glycol, bishydroxymethyl propanedioic acid diethyl ester, p-b enzenediol, and 3,6-dithia-1,8-octanediol, and wherein the isocyanate silicon-containing compound has a G'''-*NCO structure, wherein G''' is

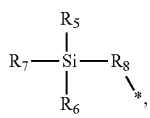

and wherein $R_5$ and $R_6$ are independently C1-C15 linear or branched alkyl, C1-C15 linear or branched alkoxyl, or

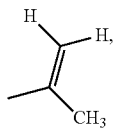

$R_7$ is C1-C15 linear or branched alkyl, C1-C15 linear or branched alkoxyl, $R_8$ is C1-C15 linear or branched alkylene, polyether group, or arylene.

2. The modified phosphorus-containing unsaturated polyester of claim 1, wherein the saturated anhydride or acid is selected from the group consisting of phenyl butanedioic acid, benzyl propanedioic acid, 3-phenyl pentanedioic acid, 1,4-phenyl diacetic acid, 1,2-phenyl diacetic acid, oxalic acid, propanedioic acid, butanedioic acid, 1,2,4,5-benzene tetracarboxylic anhydride, 3,3',4,4'-diphenylmethanone-tetracarboxylic dianhydride, naphthalenedicarboxylic anhydride, 1,4,5,8-naphthalenetetracarboxylic dianhydride, cyclobutane-1,2,3,4-tetracarboxylic dianhydride, 2,3-anthracenedicarboxylic anhydride, 3,4,9,10-perylenetetracarboxylic dianhydride, 1,2,3,4-butanetetracarboxylic dianhydride, 1,2,3,4-cyclopentenetetracarboxylic dianhydride, glutaric anhydride, adipic anhydride, 3,3-dimethylglutaric anhydride, phenylsuccinic anhydride, hexahydrophthalic anhydride,

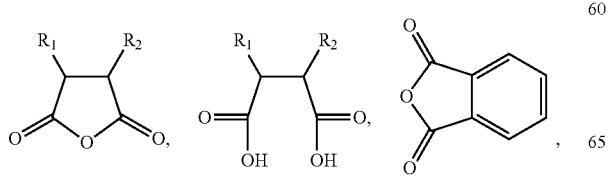

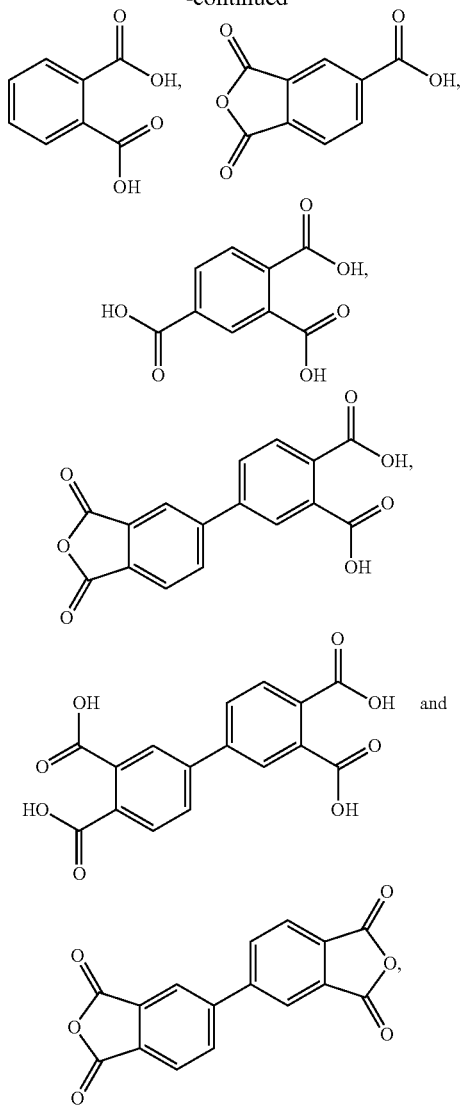

and wherein $R_1$ and $R_2$ are independently H or substituted or unsubstituted C1-C15 hydroxyl.

3. The modified phosphorus-containing unsaturated polyester of claim 1, wherein the unsaturated anhydride or acid is selected from the group consisting of,

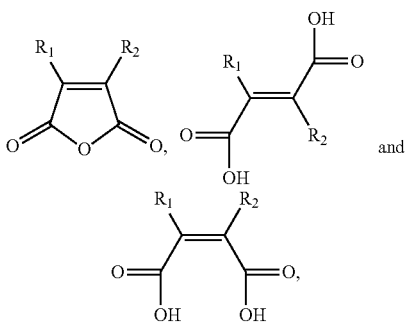

and wherein $R_1$ and $R_2$ are independently H or substituted or unsubstituted C1-C15 hydroxyl.

4. The modified phosphorus-containing unsaturated polyester of claim 1, wherein the isocyanate acrylate-based compound has a G"-G'-*NCO structure, wherein G" is a residue of a hydroxyl-containing acrylate-based compound and G' is selected from the group consisting of

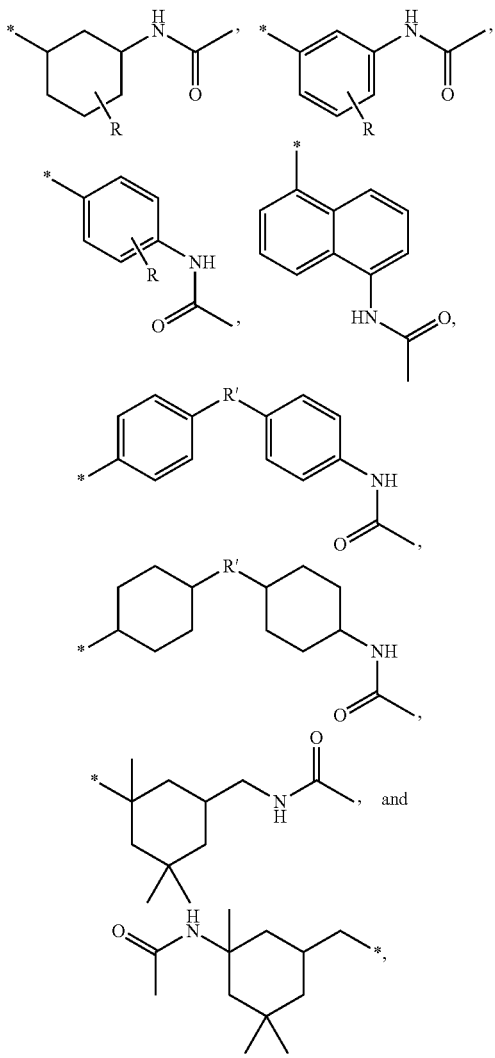

and wherein R is H or methyl, R' is

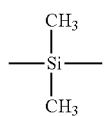

or C1-C15 linear or branched alkylene.

5. A coating material composition, which comprises the modified phosphorus-containing unsaturated polyester of claim 1, a vinyl-based monomer, and a polymerization initiator.

6. A method of preparing the modified phosphorus-containing unsaturated polyester of claim 1, comprising following steps:
(a) performing a polymerization reaction by reacting at least one diol or polyol, at least one saturated or unsaturated anhydride or acid, and

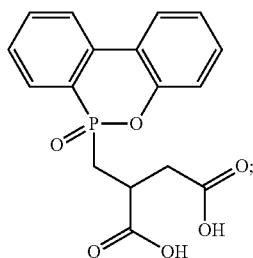 [SMILES: O=C(O)CC(CP1(=O)Oc2ccccc2-c2ccccc21)C(=O)O]

(b) reacting an isocyanate acrylate-based compound or isocyanate silicon-containing compound with the product of step (a); and
(c) optionally reacting an isocyanate silicon-containing compound with the product of step (b), wherein the diol is selected from the group consisting of ethylene glycol, diethylene glycol, propylene glycol, dipropylene glycol, neopentyl glycol, polyethylene glycol, polypropylene glycol, styrene glycol, hexylene glycol, butylene glycol, 1-phenyl-1,2-ethylene glycol, 2-bromo-2-nitro-1,3-propylene glycol, 2-methyl-2-nitro-1,3-propylene glycol, bishydroxymethyl propanedioic acid diethyl ester, p-benzenediol, and 3,6-dithia-1,8-octanediol, and wherein the isocyanate silicon-containing compound has a G'''-*NCO structure, wherein G''' is

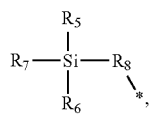

and wherein $R_5$ and $R_6$ are independently C1-C15 linear or branched alkyl, C1-C15 linear or branched alkoxyl, or

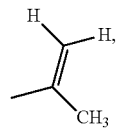

$R_7$ is C1-C15 linear or branched alkyl, C1-C15 linear or branched alkoxyl, $R_8$ is C1-C15 linear or branched alkylene, polyether group, or arylene.

7. The method of claim 6, wherein the step (a) is performed by reacting the at least one diol or polyol, the at least one unsaturated anhydride or acid, and

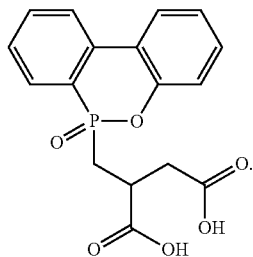 [SMILES: O=C(O)CC(CP1(=O)Oc2ccccc2-c2ccccc21)C(=O)O]

8. The method of claim 6, wherein the step (b) is performed by reacting the isocyanate acrylate-based compound with the product of step (a).

9. The method of claim 7, wherein the step (b) is performed by reacting the isocyanate acrylate-based compound with the product of step (a).

* * * * *